US009838861B2

(12) United States Patent
Singh et al.

(10) Patent No.: US 9,838,861 B2
(45) Date of Patent: Dec. 5, 2017

(54) PORTABLE DEVICE FOR INDICATING EMERGECNY EVENTS

(71) Applicants: Arati P Singh, Austin, TX (US); Ranjeev K Singh, Austin, TX (US)

(72) Inventors: Arati P Singh, Austin, TX (US); Ranjeev K Singh, Austin, TX (US)

( * ) Notice: Subject to any disclaimer, the term of this patent is extended or adjusted under 35 U.S.C. 154(b) by 0 days.

(21) Appl. No.: 15/594,585

(22) Filed: May 13, 2017

(65) Prior Publication Data
US 2017/0251349 A1    Aug. 31, 2017

Related U.S. Application Data

(63) Continuation of application No. 15/090,832, filed on Apr. 5, 2016, which is a continuation of application (Continued)

(51) Int. Cl.
*G08B 1/08*      (2006.01)
*H04W 4/22*     (2009.01)
(Continued)

(52) U.S. Cl.
CPC ............ *H04W 4/22* (2013.01); *G06F 3/0416* (2013.01); *G08B 21/02* (2013.01); *G08B 25/016* (2013.01);
(Continued)

(58) Field of Classification Search
CPC .. H04W 76/007; H04W 4/22; H04L 12/1895; G06F 21/554; H04M 1/72541; G08B 27/006; G08B 21/0211
(Continued)

(56) References Cited

U.S. PATENT DOCUMENTS 5,742,233 A * 4/1998 Hoffman ............. G08B 21/023
                                                340/10.41
6,028,514 A    2/2000 Lemelson
(Continued)

FOREIGN PATENT DOCUMENTS

EP          2698972         6/2017

OTHER PUBLICATIONS

Flashlight—4 in 1. Flashlight, Strobe, Morse Code, Lighted Magnifier, by AppAnnex, LLC, http://itunes.apple.com/us/app/flashlight-4-in-1.-flashlight/id441212306, downloaded on Feb. 14, 2012.
(Continued)

*Primary Examiner* — Hoi Lau
(74) *Attorney, Agent, or Firm* — Singh Law, PLLC

(57) ABSTRACT

A portable device including a gesture recognizer module for automatically detecting a specific sequence of gestures is described. The portable device may be used to detect a health, safety, or security related event. The portable device may further include an emergency event module for automatically determining whether the sequence of gestures corresponds to an emergency event. The portable device may further include a proximity detection module for automatically determining whether a mobile device corresponding to a user listed as an emergency contact is in a state of proximity to the portable device. The portable device may further include a notification module for automatically transmitting a message, indicating the emergency event, to the user of the mobile device determined to be in the state of proximity.

25 Claims, 5 Drawing Sheets

Related U.S. Application Data

No. 14/607,800, filed on Jan. 28, 2015, now Pat. No. 9,338,627.

(51) Int. Cl.

| | |
|---|---|
| G08B 25/01 | (2006.01) |
| G08B 25/10 | (2006.01) |
| G06F 3/041 | (2006.01) |
| G08B 21/02 | (2006.01) |
| H04W 4/02 | (2009.01) |

(52) U.S. Cl.
CPC .... G08B 25/10 (2013.01); *G06F 2203/04101* (2013.01); *H04W 4/02* (2013.01); *H04W 4/023* (2013.01)

(58) Field of Classification Search
USPC ........ 455/404.1, 404.2, 466, 419; 340/539.1, 340/539.13, 539.12, 521, 539.23, 539.21, 340/8.1
See application file for complete search history.

(56) References Cited

U.S. PATENT DOCUMENTS

| | | | |
|---|---|---|---|
| 6,323,846 B1 | 11/2001 | Westerman et al. | |
| 6,427,072 B1* | 7/2002 | Reichelt | H02J 9/002 |
| | | | 455/404.1 |
| 6,624,754 B1* | 9/2003 | Hoffman | G08B 21/023 |
| | | | 340/573.1 |
| 6,847,892 B2* | 1/2005 | Zhou | G01S 5/0027 |
| | | | 340/426.1 |
| 6,917,797 B1* | 7/2005 | Hoppa | G08B 21/0272 |
| | | | 340/628 |
| 7,289,786 B2 | 10/2007 | Krasner | |
| 7,574,195 B2 | 8/2009 | Krasner et al. | |
| 7,577,420 B2 | 8/2009 | Srinivasan et al. | |
| 8,046,721 B2 | 10/2011 | Chaudhri et al. | |
| 8,170,656 B2 | 5/2012 | Tan et al. | |
| 8,275,352 B2 | 9/2012 | Forstall et al. | |
| 8,542,206 B2* | 9/2013 | Westerman | G06F 3/0416 |
| | | | 178/18.01 |
| 8,548,421 B2* | 10/2013 | Ray | G10L 13/043 |
| | | | 455/404.1 |
| 8,665,089 B2 | 3/2014 | Saigh et al. | |
| 8,676,541 B2 | 3/2014 | Schrock et al. | |
| 9,710,092 B2 | 7/2017 | Han et al. | |
| 2002/0160807 A1 | 10/2002 | Robertson et al. | |
| 2003/0078029 A1 | 4/2003 | Petite | |
| 2006/0011399 A1* | 1/2006 | Brockway | A61B 5/18 |
| | | | 180/272 |
| 2007/0200716 A1 | 8/2007 | Haase et al. | |
| 2007/0210910 A1 | 9/2007 | Norstrom et al. | |
| 2008/0191863 A1 | 8/2008 | Boling et al. | |
| 2008/0284587 A1 | 11/2008 | Saigh et al. | |
| 2009/0051648 A1 | 2/2009 | Shamaie et al. | |
| 2009/0054029 A1 | 2/2009 | Hogberg et al. | |
| 2009/0138353 A1 | 5/2009 | Mendelson | |
| 2009/0180355 A1 | 7/2009 | Cartwright | |
| 2009/0215494 A1 | 8/2009 | Causey et al. | |
| 2009/0247114 A1 | 10/2009 | Sennett et al. | |
| 2009/0322513 A1 | 12/2009 | Hwang et al. | |
| 2010/0093405 A1* | 4/2010 | Ewell, Jr. | H04M 1/66 |
| | | | 455/566 |
| 2010/0190467 A1* | 7/2010 | Scott | H04M 1/2745 |
| | | | 455/404.2 |
| 2010/0190468 A1* | 7/2010 | Scott | H04M 1/2745 |
| | | | 455/404.2 |
| 2010/0210290 A1 | 8/2010 | Riley et al. | |
| 2010/0279647 A1* | 11/2010 | Jacobs et al. | |
| 2010/0291894 A1* | 11/2010 | Pipes | H04W 4/02 |
| | | | 455/404.2 |
| 2011/0103302 A1 | 5/2011 | Hall | |
| 2011/0111736 A1* | 5/2011 | Dalton | A61B 5/1112 |
| | | | 455/414.1 |
| 2011/0130112 A1 | 6/2011 | Saigh et al. | |
| 2011/0151829 A1* | 6/2011 | Velusamy | H04L 51/20 |
| | | | 455/404.2 |
| 2011/0270984 A1 | 11/2011 | Park | |
| 2011/0319048 A1 | 12/2011 | Matlock | |
| 2012/0092161 A1 | 4/2012 | West | |
| 2012/0146903 A1 | 6/2012 | Arihara et al. | |
| 2012/0157037 A1* | 6/2012 | Hoffman | G08B 25/08 |
| | | | 455/404.2 |
| 2012/0194976 A1 | 8/2012 | Golko et al. | |
| 2012/0197092 A1 | 8/2012 | Luo et al. | |
| 2012/0212339 A1* | 8/2012 | Goldblatt | G08B 25/016 |
| | | | 340/539.11 |
| 2012/0295661 A1* | 11/2012 | Kim | G06F 3/017 |
| | | | 455/556.1 |
| 2013/0029647 A1* | 1/2013 | Nunally | G06Q 50/01 |
| | | | 455/414.1 |
| 2013/0052983 A1* | 2/2013 | Fletcher | H04W 4/22 |
| | | | 455/404.2 |
| 2013/0222133 A1 | 8/2013 | Schultz et al. | |
| 2013/0331058 A1* | 12/2013 | Harvey | H04W 4/22 |
| | | | 455/404.2 |
| 2014/0066000 A1* | 3/2014 | Butler | H04M 1/72538 |
| | | | 455/404.2 |
| 2014/0162687 A1 | 6/2014 | Edge | |
| 2014/0206428 A1* | 7/2014 | Thompson | A63F 13/06 |
| | | | 463/20 |
| 2014/0218269 A1 | 8/2014 | Cazalet et al. | |
| 2014/0240103 A1 | 8/2014 | Lake et al. | |
| 2014/0274216 A1* | 9/2014 | Olodort | H04M 1/006 |
| | | | 455/566 |
| 2014/0321624 A1 | 10/2014 | Weng et al. | |
| 2014/0335814 A1 | 11/2014 | Gudlavenkatasiva et al. | |
| 2014/0370879 A1 | 12/2014 | Redding et al. | |
| 2015/0004984 A1 | 1/2015 | Kim et al. | |
| 2015/0031322 A1 | 1/2015 | Twina et al. | |
| 2015/0111524 A1 | 4/2015 | South | |
| 2015/0147997 A1 | 5/2015 | Shaw et al. | |
| 2015/0192658 A1* | 7/2015 | Ullah | G01S 5/04 |
| | | | 455/456.1 |
| 2015/0223271 A1* | 8/2015 | Penix | H04W 76/007 |
| | | | 455/404.2 |
| 2015/0230072 A1 | 8/2015 | Saigh et al. | |
| 2015/0319294 A1 | 11/2015 | Sudhir | |
| 2016/0071392 A1 | 3/2016 | Hankey et al. | |
| 2016/0094259 A1 | 3/2016 | Hatanaka et al. | |
| 2017/0046063 A1 | 2/2017 | Shaffer et al. | |

OTHER PUBLICATIONS

Universal Mobile Telecommunications System (UMTS); LTE; Proximity-based services (ProSe); Stage 2 (3GPP TS 23.303 version 12.2.0 Release 12), 2014.

Facebook Launches "Nearby Friends" With Opt-In Real-Time Location Sharing to Help You Meet up, by Hardware Battlefield, http://techcrunch.com/2014.04.17/facebook-nearby-friends/, downloaded on Oct. 25, 2015.

Kenney, Tanasia, "Need to Send an 'SOS' After Police Pull You Over? There's an App for That", Published on Aug. 27, 2016, Available at: http://atlantablackstar.com/2016/08/27/need-send-sos-after-police-pull-over-theres-app-that/.

"Notice of Allowance and Fee(s) Due Issued in U.S. Appl. No. 15/090,832", dated Sep. 6, 2017, 11 pages.

* cited by examiner

PORTABLE DEVICE FOR INDICATING EMERGECNY EVENTS

BACKGROUND

1. Field

This disclosure generally relates to health, safety, and/or security systems, devices, and methods.

2. Related Art

Various transportation and travel technologies have brought greater freedom of movement to individuals. Increased mobility has created situations in which many individuals might find them alone, or in a small group, and facing an issue with their health, safety, and/or security. Being alone might be a problem when faced with an emergency relating to health, safety, and/or security.

Similarly, increasing aging of the world population has created a set of individuals, who might have a higher risk of being alone and experiencing an emergency relating to health, safety, and/or security.

Current solutions to these problems are not sufficient and accordingly there is a need for improved systems, devices, and methods.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

BRIEF SUMMARY OF THE INVENTION

Figure 1:
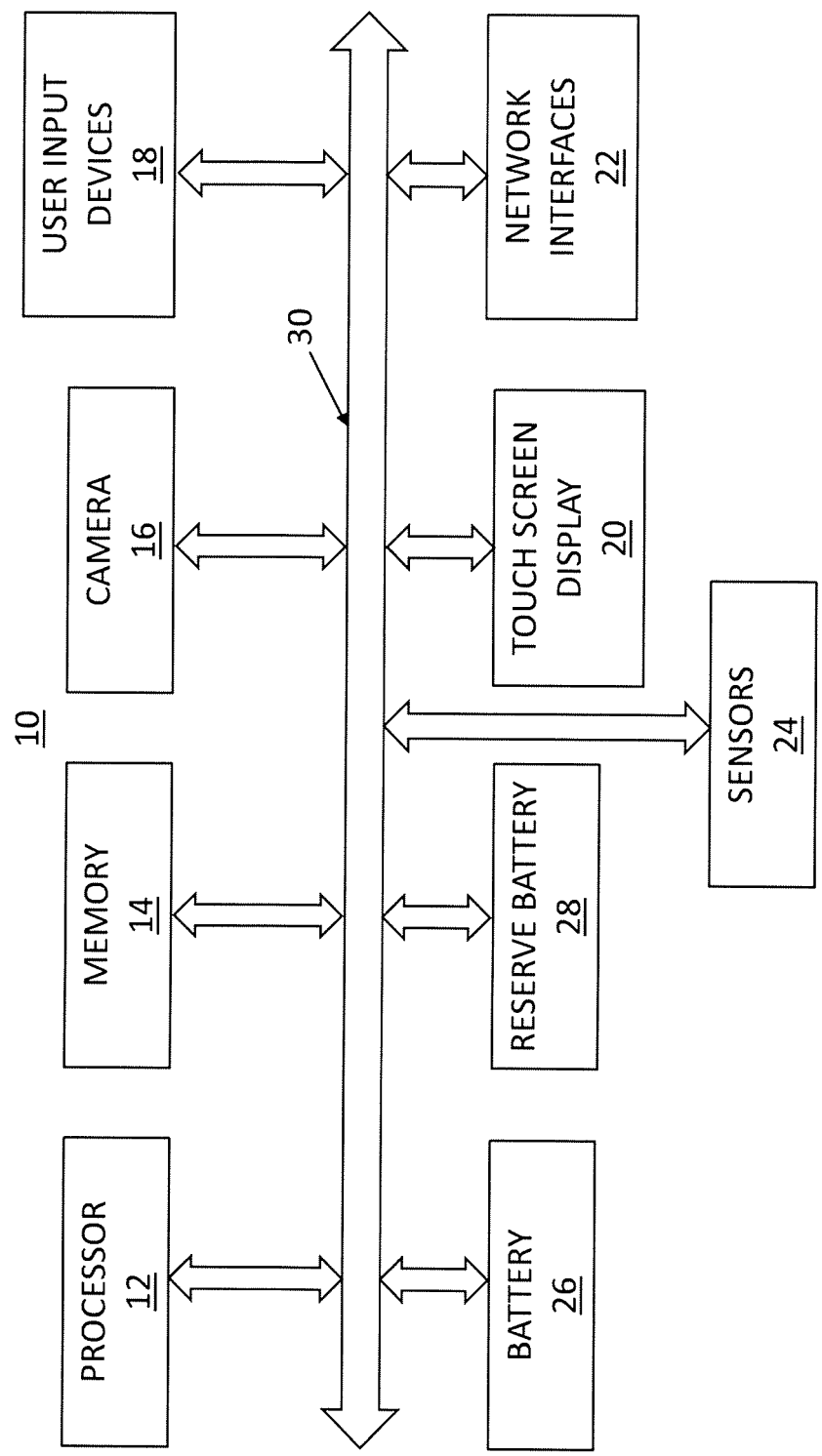
FIG. 1 is a schematic diagram of an exemplary health, safety, and/or security (HSS) device.

In one aspect, a portable device including a gesture recognizer module for automatically detecting a specific sequence of gestures is described. The portable device may further include an emergency event module for automatically determining whether the sequence of gestures corresponds to an emergency event. The portable device may further include a proximity detection module for automatically determining whether a mobile device corresponding to a user listed as an emergency contact is in a state of proximity to the portable device. The portable device may further include a notification module for automatically transmitting a message, indicating the emergency event, to the user of the mobile device determined to be in the state of proximity.

In another aspect, a portable device including a touch screen and a tap recognizer module for automatically detecting a specific sequence of taps on the touch screen is provided. The portable device may further include an emergency event module for automatically determining whether the sequence of taps corresponds to an emergency event. The portable device may further include a proximity detection module for automatically determining whether a mobile device corresponding to a user listed as an emergency contact is in a state of proximity to the portable device. The portable device may further include a notification module for automatically transmitting a message, indicating the emergency event, to the user of the mobile device determined to be in the state of proximity.

In yet another aspect, a portable device including a touch screen and a swipe recognizer module for automatically detecting a specific pattern of swipes on the touch screen. The portable device may further include an emergency event module for automatically determining whether the pattern of swipes corresponds to an emergency event. The portable device may further include a proximity detection module for automatically determining whether a mobile device corresponding to a user listed as an emergency contact is in a state of proximity to the portable device. The portable device may further include a notification module for automatically transmitting a message, indicating the emergency event, to the user of the mobile device determined to be in the state of proximity.

In yet another aspect, a method in a portable system including a footwear including a sensor module for automatically detecting a specific sequence of hops or jumps is provided. The method may include automatically determining whether the sequence of hops or jumps corresponds to an emergency event. The method may further include automatically determining whether a mobile device corresponding to a user listed as an emergency contact is in a state of proximity to the portable device. The method may further include automatically transmitting a message, indicating the emergency event, to the user of the mobile device determined to be in the state of proximity.

DETAILED DESCRIPTION

This application is a continuation of U.S. patent application Ser. No. 15/090,832, entitled "A Portable Device for Indicating Emergency Events," filed on Apr. 5, 2016, which is a continuation of U.S. patent application Ser. No. 14/607,800, entitled "A Portable Device for Indicating Emergency Events," filed on Jan. 28, 2015, which issued as U.S. Pat. No. 9,338,627, and the disclosure of each of the prior filed applications is incorporated herein in its entirety by reference.

Seeing a need for a quick, universal way to call for help, government agencies began the widespread adoption of "911" as a single emergency telephone number in the 1980s. Landline phones were the primary way to call 911 for years. The proliferation of cell phones and smartphones have made emergency assistance even more easily obtainable, particularly when one is away from a traditional landline phone.

Despite the ubiquity of smartphones, dialing 911 from one still has barriers that may be difficult, time-consuming, or even impossible—particularly in the very emergency situations in which one is most likely to dial 911. One may need to turn on the phone, unlock the screen, open the dialing application, and then actually dial 911—which can use valuable time. In some cases, there might be an easy way to dial 911 (such as the "emergency" option on a Blackberry, or a 911Now app for Android phones), but even those would require the phone to be on, the screen unlocked, manual dexterity, and moderate vision capabilities. To address these deficiencies, in one embodiment, an HSS device 10 is described that provides a way for people to tap a "Morse-like" code onto any HSS device's (for example, mobile phone or smartphone) screen, whether the device is on, on with a locked screen, has a "dead" battery, or is turned off. This would be useful in a situation where someone has limited vision, mobility, or dexterity (such as being bound and gagged in the trunk of a car) and needs to call for emergency assistance. Rather than fumbling to turn on the phone, unlocking the screen, pulling up the dialing application, and then dialing 911 onto a digital dial pad screen image (without the tactile cues of a push-button dial pad), a person could tap a pre-programmed code (e.g., two long taps followed by 2 short taps) to automatically dial 911 or automatically perform a more complex emergency sequence.

FIG. 1 is a schematic diagram of an exemplary HSS device 10 that may be an exemplary portable device. Without limitations, such portable device may be any device that can be carried by a person, such as a handheld device or a wearable device. In one embodiment, HSS device 10 may include a processor 12, memory 14, camera 16, and user input devices 18, touch screen display 20, network interfaces 22, sensors 24, battery 26, and reserve battery 28. Each of these components may be connected to each other (as needed for the functionality of HSS device 10) via a bus system 30. Exemplary HSS devices include a smartphone, such as an iPhone, a smart watch, or any other device that an individual may have on their person, including, smart eyeglasses, shoes, or other wearable devices. Processor 12 may execute instructions stored in memory 14. Camera 16 may capture both still and moving images. User input devices, include haptic devices, such as keyboards or buttons, and touch screens. Touch screen display 20 may be any type of display, such as LCD, LED, or other types of display. As an example, touch screen display 20 may be a capacitive touch screen. The touch screen (e.g., display 20) can detect touch events, such as tapping on the screen or swiping on the screen. In response to such events, in combination with other modules, described later, touch image data may be generated and submitted to processor 12. In addition to, or in the alternative to processor 12, other processors, such as touch screen controllers may also be used to recognize taps or swipes. Additional details regarding touch image data acquisition and processing are described in U.S. Pat. No. 6,323, 846, which is incorporated by reference herein in its entirety. Network interfaces may include communication interfaces, such as cellular radio, Bluetooth radio, UWB radio, or other types of wireless or wired communication interfaces. Sensors 24 may include a variety of sensors, such as accelerometers, gyroscopes, GPS, and proximity sensors. Battery 26 may be any portable battery, such as a chargeable lithium-ion battery. Reserve battery 28 may also be any portable battery, such as a chargeable lithium-ion battery. Although FIG. 1 shows a specific number of components arranged in a certain manner, HSS device 10 may include additional or fewer components arranged differently. In addition, HSS device 10 need not be a dedicated device for health, safety, and security functions; instead it could be a mobile phone, a smart watch, an augmented reality device (e.g., Google Glass) or any other wearable or portable device.

Figure 2:
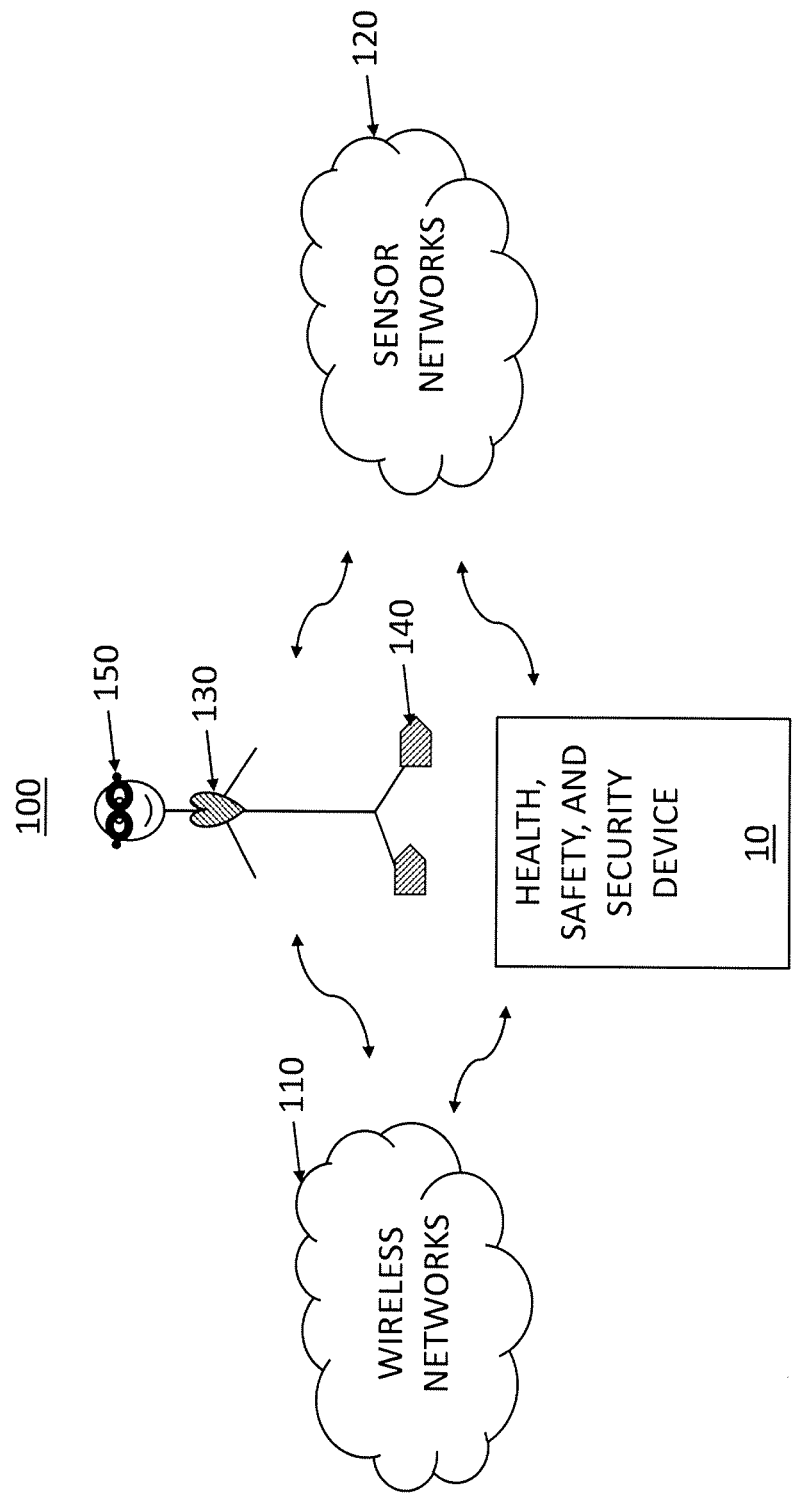
FIG. 2 is an exemplary system environment for the HSS device of FIG. 1.

FIG. 2 shows an exemplary environment 100 in which the methods associated with HSS device 10 may be performed. HSS device 10 may communicate with wireless networks 110. Wireless networks 110 may include cellular networks, Wi-Fi networks, Personal Area Networks, such as Bluetooth, or other types of wireless networks. Wireless networks 110 may include not only communication apparatus, such as cell sites, but also cloud computing infrastructure. The cloud computing infrastructure may be used to provide additional computing and storage functionality to HSS device 10. HSS device 10 may also communicate with sensor networks 120. Sensor networks may allow HSS device 10 to engage in machine-to-machine communication. While FIG. 2 shows separate sensor networks 120, the functionality related to these networks may be included in wireless networks 110. Via wireless networks 110, and as needed, via sensor networks 120, HSS device 10 may also communicate with additional smart devices either worn by a user of HSS device 10 or carried by the user of HSS device 10. As an example, the user may have smart glasses 150, a wearable electronics device 130, or smart footwear 140 on their person. Each of these devices may communicate with HSS device 10 via wireless networks 110 or sensor networks 120. Each of these devices may have the same or similar functionality and modules as described for HSS device 10. Thus, for example, wearable electronics device 130 may be part of the clothing worn by the user and that might be the only device on the user's person and still provide all or most of the functions related to HSS device 10. In one embodiment, smart footwear 140 may have several sensors, controllers, and memory embedded in them. As an example, these components may be part of an integrated circuit coupled to antenna. These components may be housed in the sole of the footwear. A battery may also be included in the sole to power these components. Additional details regarding smart footwear with sensors are described in U.S. Pat. No. 8,676,541, which is incorporated by reference herein in its entirety. As an example, FIG. 6 of the '541 patent and related description describe similar components embedded in the sole of footwear. The memory component of smart footwear 140 may include instructions, which when executed by a processor, may provide functionality associated with smart footwear 140. Smart glasses 150 may have several sensors, controllers, and memory embedded in them. As an example, these components may be part of an integrated circuit coupled to antenna. These components may be housed in the frame of the glasses or a housing attached to the frames. A battery may also be included in the housing to power these components. Additional details of smart glasses 150 are described in U.S. Patent Application Publication No. 2014/0218269, which is based on application Ser. No. 13/762,146, filed on Feb. 7, 2013, which is incorporated by reference herein in its entirety. In particular, FIG. 7 of the '146 application and related description describe a head mounted device, which could form the basis of smart glasses 150. Not all aspects depicted in FIG. 2 are needed for each method; instead some or all of the aspects may be used.

Figure 3:
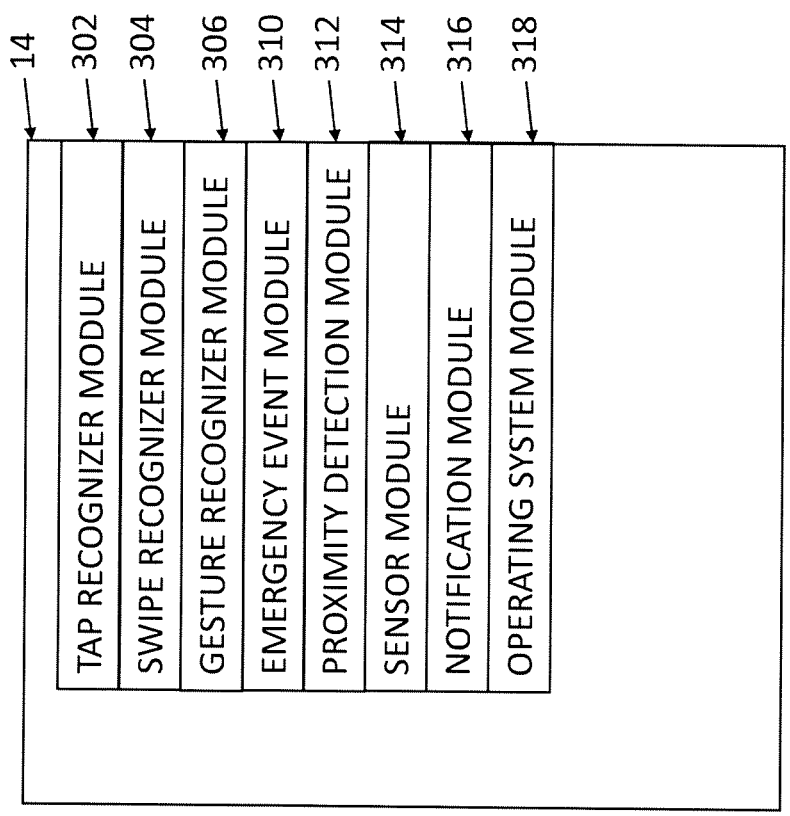
FIG. 3 is a schematic diagram showing various modules for performing methods associated with HSS device of FIG. 1.

FIG. 3 is a schematic diagram showing various exemplary modules for performing methods associated with HSS device 10 of FIG. 1. In one embodiment, these modules may be stored in memory 14 of HSS device 10 and may contain software instructions that when executed by processor 12 of HSS device 10 may provide the functionality associated with these modules. In one embodiment, some or all of these modules may be a part of a downloadable application from the Internet, as an example from Apple's iTunes store or Google's Google Play store. Exemplary modules stored in memory may include a tap recognizer module 302, a swipe recognizer module 304, a gesture recognizer module 306, an emergency event module 310, a proximity detection module 312, a sensor module 314, a notification module 316, and an operating system module 318. Tap recognizer module 302 may include instructions that when executed by processor 12 may result in capturing touch screen data corresponding to the taps. Additional details regarding capturing key tap events and processing are described in U.S. Pat. No. 8,542, 206, which is incorporated by reference herein in its entirety. In particular, FIG. 9 and related description of the '206 patent describe capturing image data corresponding to key tap events. In one embodiment, tap recognizer module 302 may differentiate between a tap with a short duration and a tap with a long duration. This way, a user of HSS device 10 may enter a Morse-like code sequence. Thus, for example, a series of two short taps followed by a long tap, which is then followed by a series of two additional short taps may be the specific sequence that indicates an emergency event. Indeed, other specific sequence of taps may also be used. A user of HSS device 10 may configure the device and provide the specific sequence of taps that would indicate an emergency event. The taps entered via touch screen display 20 may be communicated to processor 12, which in turn may provide the data to emergency event module 310.

Swipe recognizer module 304 may include instructions that when executed by processor 12 may result in automatically capturing touch screen data corresponding to the swipes. Additional details regarding capturing swipe events and processing are described in U.S. Pat. No. 8,542,206, which is incorporated by reference herein in its entirety. In particular, FIG. 10 and related description of the '206 patent describe capturing image data corresponding to swipe events. In one embodiment, swipe recognizer module 304 may differentiate between a swipe to the left and a swipe to the right. This way, a user of HSS device 10 may enter a specific swipe sequence. Thus, for example, a series of two swipes to the left followed by two swipes to the right may be the specific sequence that indicates an emergency event. Indeed, other specific sequence of swipes may also be used. A user of HSS device 10 may configure the device and provide the specific sequence of swipes that would indicate an emergency event. The swipes entered via touch screen display 20 may be communicated to processor 12, which in turn may provide the data to emergency event module 310.

Gesture recognizer module 306 may include instructions that when executed by processor 12 may result in automatically capturing data corresponding to the gestures. Additional details regarding capturing gesture events and processing are described in U.S. Patent Publication No. 2012/0146903, which is incorporated by reference herein in its entirety. In particular, FIG. 12 and related description of this publication describe recognizing various gesture events, such as move from left to right or move from right to left. In one embodiment, gesture recognizer module 306 may differentiate between a move from left to right and a move from right to left. This way, a user of HSS device 10 may enter a specific gesture sequence. Thus, for example, two moves from left to right followed by two moves from right to left may be the specific sequence that indicates an emergency event. Indeed, other specific sequence of gestures may also be used. A user of HSS device 10 may configure the device and provide the specific sequence of gestures that would indicate an emergency event. The gestures recognized by gesture recognizer module 306 may be communicated to processor 12, which in turn may provide the data to emergency event module 310. While FIG. 3 describes these modules as separate modules, any of these modules can be combined or further separated in terms of functionality. In addition, the specific sequence of taps, swipes, or gestures may be programmed by a user of HSS device 10 or by the supplier of such devices. Alternatively, such sequences may be programmed by an application developer or a service provider for HSS device 10.

With continued reference to FIG. 3, emergency event module 310 may be configured to automatically determine whether a specific sequence of taps, swipes, or gestures indicates an emergency event. In one embodiment, emergency event module 310 may receive the sequence of taps from tap recognizer module 302. In another embodiment, emergency event module 310 may receive the sequence of swipes from swipe recognizer module 304. In another embodiment, emergency event module 310 may receive the sequence of gestures from gesture recognizer module 306. In another embodiment, the specific sequence indicating an emergency event could be a sequence of taps, swipes, and/or gestures. As an example, a sequence could be a tap followed by a swipe to the left and then followed by a gesture indicating a move to the right. The user of HSS device 10 may configure the device to recognize any such specific sequence and store the results in the memory of HSS device 10. In another embodiment, a sequence of hops or jumps could also indicate an emergency event. As part of this example, smart footwear 140 may be configured to automatically detect hops or jumps and information regarding such hops and/or jumps may be automatically communicated to emergency event module 310, which in turn may automatically determine whether the sequence of hop and/or jumps corresponds to an emergency event. An exemplary sequence of hops and jumps may include two jumps followed by a hop to the left and a hop to the right. In another embodiment, a sequence could be a combination of taps, swipes, gestures, and/or jumps/hops. In another embodiment, wearable electronics device 130 may be a wrist watch that could also be configured to detect a sequence of arm movements. Thus, for example, a sequence of arm movements indicating arm being moved up, then down, then up, and down again in a short period of time may indicate an emergency event. In another embodiment, a sequence indicative of an emergency event could be a combination of taps, swipes, gestures, jumps, hops, and/or arm movements.

In another embodiment, an indication of an emergency event may come automatically from a health monitoring sensor, such as a sensor for detecting a seizure. In this embodiment, the user of HSS device 10 need not indicate an emergency event via taps, swipes, gestures, jumps, hops or arm movements. Instead, a seizure detection sensor may be included as part of a head band or a cap that a user with HSS device 10 may wear. While this embodiment is described in reference to a sensor for detecting seizure, the sensor could be any sensor that can detect a hazardous health condition, such as a heart attack, a stroke, a lack of consciousness, or other types of health conditions that might warrant an emergency response. The seizure detection sensor may be the type described in U.S. Patent Publication 2012/0197092, which is incorporated by reference herein in its entirety. In particular, an EEG detection and an EEG control system, as described in FIGS. 2 and 3 and the related description of the '092 patent publication may be incorporated in the head band or the cap worn by a user of HSS device 10. In addition, steps 610 to 660 of FIG. 6 and related description in the '092 patent publication provide additional details regarding one example of detecting a seizure event. Upon the automatic detection of the seizure event, emergency event module 310 may automatically communicate with other modules, including proximity detection module 312 and notification module 318 in a similar manner as would be the case when a user enters a specific sequence of taps indicating an emergency event.

In one embodiment, once emergency event module 310 automatically detects an emergency event, it might be configured to automatically dial an emergency number, such as 911. The dialed emergency number may be a number other than 911 depending upon the location of HSS device 10. In one embodiment, HSS device 10 may automatically, in real-time, obtain information concerning the emergency number to dial depending upon the location of HSS device 10. This could be accomplished using service side functionality associated with wireless networks 110. The location of HSS device 10 may be detected using GPS (as part of sensors 24) and may be processed by sensor module 314. Sensor module 314 may format and pass this information to emergency event module 310. As an example, an accelerometer for detecting a shock to the portable device may provide shock related information to the emergency event module. Emergency event module 301 may automatically analyze the shock related information to determine whether the shock related information corresponds to an emergency event. For example, the rate of acceleration experienced by HHS device 10 may indicate the user of the device falling down and/or being thrown. Upon the automatic detection of the emergency event, emergency event module 310 may automatically communicate with other modules, including proximity detection module 312 and notification module 318 in a similar manner as would be the case when a user enters a specific sequence of taps indicating an emergency event.

In one embodiment, HSS device 10 may further include a proximity detection module 312. Proximity detection module 312 may rely on LTE Direct (also known as 3GPP/3GPP2 ProSe proximity standard) to automatically determine which of the contacts have mobile devices that are in proximity to HSS device 10, and thus are in a state of proximity. In one embodiment, a state of proximity may refer to contacts whose cell phone devices are being served by the same cell site as HSS device 10. A state of proximity may also refer to whether HSS device 10 and the other user's (identified as contacts in a contact database associated with HSS device 10) devices are within the same city, town, or ZIP code area. As part of proximity detection, HSS device 10 may automatically perform location measurements to determine its location. HSS device 10 may automatically perform such measurements alone or in combination with servers in wireless networks 110. Either a control plane location solution, such as defined by 3GPP and 3GPP2 or a user plane location such as Secure User Plane Location (SUPL) defined by Open Mobile Alliance (OMA) may be used. Additional details concerning determining a state of proximity based on a control plane solution or a user plane solution are described in U.S. Patent Publication No. 2014/0162687, which is incorporated by reference herein in its entirety. In particular, FIGS. 7, 9, 14, 15, and 16 and related description provide additional details for determining the state of proximity. Other devices that are associated with the user's contacts may also automatically perform location measurements and report the measurements to proximity detection module 312 using wireless networks 110. A state of proximity may refer to a current state of proximity or a predicted state of proximity. The current and/or predicted state of proximity may be determined using the techniques described in U.S. Patent Publication No. 2014/0162687, which is incorporated by reference herein in its entirety. As an example, FIGS. 7-13 of the '687 publication describe various protocols that could be used to assist in determining proximity between two devices. HSS device 10 may have a set of contacts stored as part of a database that could be automatically accessed, directly or indirectly, by emergency event module 310. Once any users with mobile devices listed as contacts are determined to be having a mobile device in a state of proximity, emergency event module 310 may coordinate with notification module 316 to automatically transmit a message to such mobile devices.

In another embodiment, a user of HSS device 10 may designate contact information to use in case of emergency (ICE). Several contacts could be designated for use in ICE. As part of this embodiment, HSS device 10 may first determine whether any ICE contacts with a mobile device are in a state of proximity. If not, then the other contacts may be considered.

In one embodiment, the message may be a pre-configured message that may be automatically transmitted via SMS, MMS, or similar services. In an alternative embodiment, prior to transmission, the pre-configured message may be modified to include additional information based on sensor measurements. As an example, HSS device 10 may determine its velocity by interacting with a location server (including functionality on the network side in FIG. 4) in wireless networks 110. The velocity may be automatically included as part of the pre-configured message.

Figure 4:
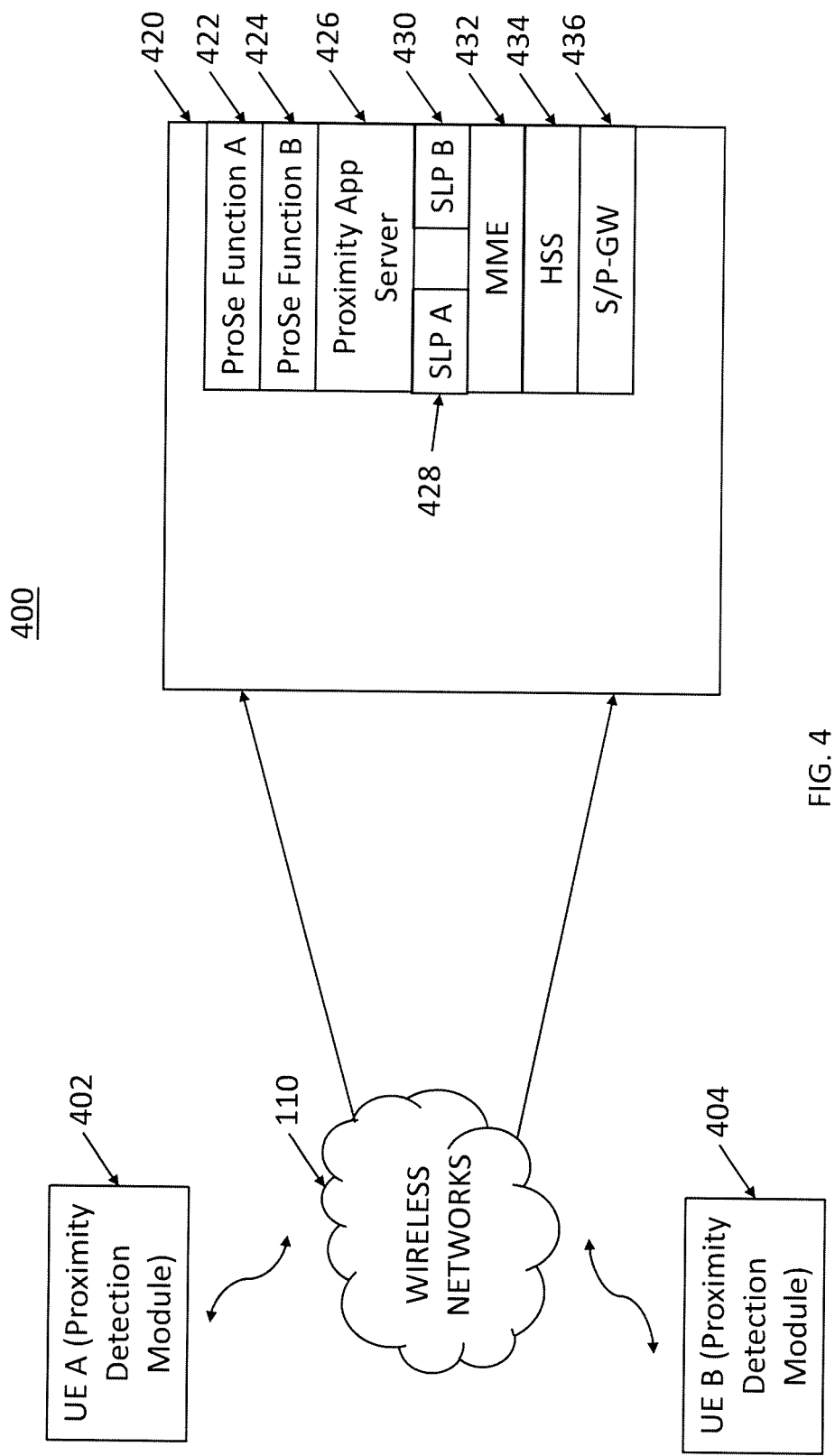
FIG. 4 is a schematic diagram showing an exemplary system environment for detecting a state of proximity between two user devices.

FIG. 4 is a schematic diagram showing an exemplary system environment 400 for detecting a state of proximity between two user devices. In one embodiment, the state of proximity is automatically determined in real-time. In other words, the state of proximity is derived dynamically in real-time as and when an emergency event is detected by emergency event module 310. As an example, this ensures that only those mobile devices are contacted in case of emergency that, at or near the time of emergency, are in the vicinity of HSS device 10. Thus, even if a mobile device of a listed contact has the same area code as the use of HSS device 10, that listed contact will not be considered to be in a state of proximity, unless the mobile device is turned on and is within a certain area proximate to HSS device 10, such as being served by the same cell site as HSS device 10, the same town or city or ZIP code area. In one embodiment, proximity detection module 312 may automatically determine a state of proximity between two user devices (e.g., HSS device 10 and other mobile devices) using system environment 400. In the context of FIG. 4, HSS device 10 may be one of the user elements (UEs), as this term is used in modern cellular networks. Thus, for example, HSS device 10 may be UE A 402 and another mobile device may be UE B 404. User devices UE A 402 and UE B 404 each may have an instance of proximity detection module 312. Although not shown in FIG. 4, each of these user devices may have the modules that are shown in FIG. 3. These user devices may communicate with wireless networks 110 that may include service side functionality 420. Service side functionality 420 may include multiple modules for supporting the detection of a state of proximity between UE A 402 and UE B 404. By way of example, service side functionality 420 may include a ProSe Function A 422, a ProSe Function B 424, a Proximity App Server 426, a SLP A 428, a SLP B 430, a MME 432, a HSS 434, and a S/P-GW 436. ProSe Function A 422 may provide the network related actions required for proximity services to UE A 402. ProSe Function B 424 may provide the network related actions required for proximity services to UE B 404. Although FIG. 4 shows separate ProSe functions, their functionality could be combined. Each of these functions may provide proximity related services, including direct discovery and direct communications in case any of the user devices cannot be served by the cellular network E-UTRAN. Proximity App Server 426 may be associated with providing services for emergency event detection and notification. Proximity App Server 426 may handle application registration requests from user devices that have emergency event detection and notification modules. SLP A 428 may be one instance of Secure User Plane Location (SUPL) Location Platform (SLP). To request location updates for UE A 402, ProSe Function A may contact SLP A 428 and to request location updates for UE B 404, ProSe Function B may contact SLP B 430. The UE's location may be reported intermittently to their respective ProSe Functions. Whenever respective ProSe Functions receive location updates for UE A 402 and UE B 404, they may perform a proximity analysis to determine a state of proximity of UE A 402 and UE B 404. Alternatively, ProSe Functions may perform a proximity analysis only when they receive a notification from emergency event module 310 via proximity detection module 312.

With continued reference to FIG. 4, MME 432, which stands for Mobility Management Entity, may handle control plane management related to UE A 404 and UE B 404. As an example, MME 432 may provide indication to E-UTRAN that these user devices are authorized to use the proximity detection service, including the ProSe Functions. HSS 434, which stands for Home Subscriber Sever, is a database that contains user-related and subscriber-related information. MME 432 may access HSS 434 to obtain such information to determine whether the user devices that are requesting emergency event notification and proximity detection are authorized to use such services. S/P-GW 436, which stands for Serving/PDN gateways, may handle the user plane, including handover. While FIG. 4 depicts separate modules and functions, these could be combined or distributed in other manners, as well.

Figure 5:
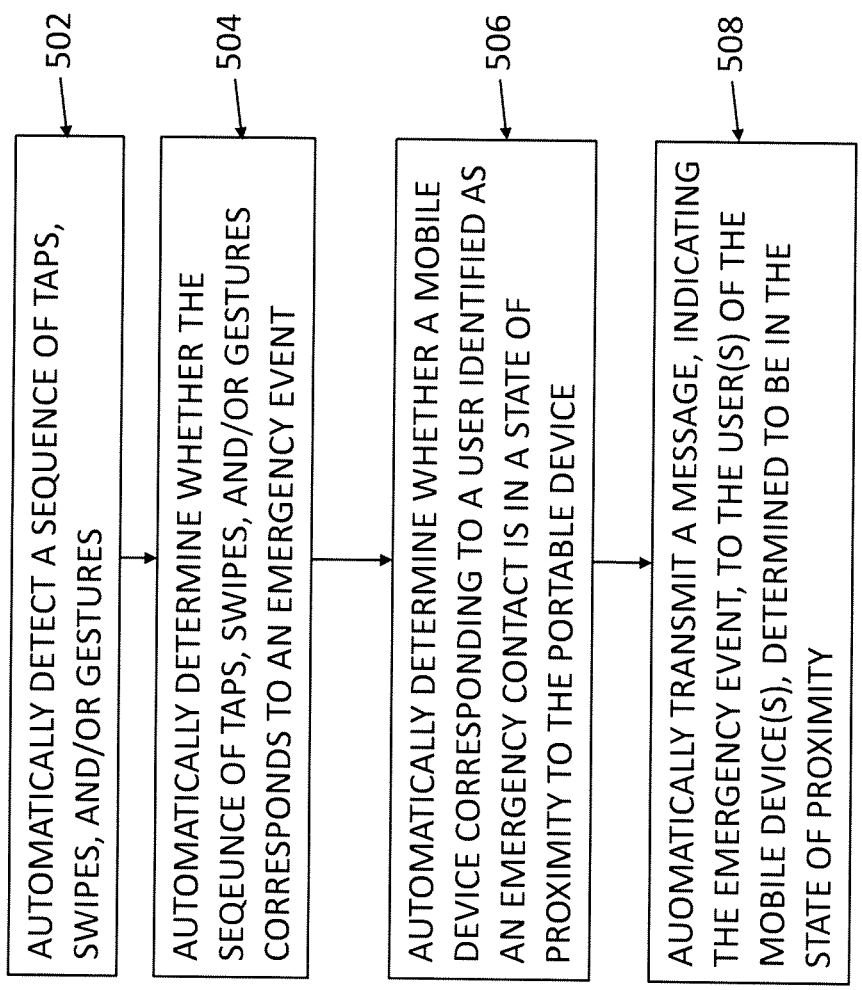
FIG. 5 is an exemplary flow chart of methods associated with HSS device of FIG. 1.

FIG. 5 is an exemplary flow chart of methods associated with HSS device 10 of FIG. 1. In step 502, HSS device 10 may detect a sequence of taps, swipes, and/or gestures. As described earlier with respect to FIG. 3, the sequence of taps, swipes, and/or gestures may be detected using modules stored in memory of HSS device 10.

With continued reference to FIG. 5, in step 504, emergency event module 310 may automatically determine whether a specific sequence of taps, swipes, or gestures indicates an emergency event. In one embodiment, emergency event module 310 may automatically receive the sequence of taps from tap recognizer module 302. In another embodiment, emergency event module 310 may automatically receive the sequence of swipes from swipe recognizer module 304. In another embodiment, emergency event module 310 may automatically receive the sequence of gestures from gesture recognizer module 306. In another embodiment, the specific sequence indicating an emergency event could be a sequence of taps, swipes, and/or gestures. As an example, a sequence could be a tap followed by a swipe to the left and then followed by a gesture indicating a move to the right. In another embodiment, a sequence of hops or jumps could also indicate an emergency event. As part of this example, smart footwear 140 may be configured to automatically detect hops or jumps and information regarding such hops and/or jumps may be communicated to emergency event module 310, which in turn may automatically determine whether the sequence of hop and/or jumps corresponds to an emergency event. An exemplary sequence of hops and jumps may include two jumps followed by a hop to the left and a hop to the right. In another embodiment, a sequence could be a combination of taps, swipes, gestures, and/or jumps/hops. In another embodiment, wearable electronics device 130 may be a wrist watch that could also be configured to detect a sequence of arm movements. Thus, for example, a sequence of arm movement indicating arm being moved up, then down, then up, and again down in a short period of time may indicate an emergency event. Arm movement could be detected by monitoring arm activity using a band or a watch (another HSS device 10) worn on the user's arm. As an example, an inertial sensor (an accelerometer and/or a gyroscope), which might be part of sensors 24, may be part of the arm band or the watch. An exemplary inertial sensor might be the MPU-9150 sensor sold by InvenSense. In sum, it might include an accelerometer, a gyroscope, and a compass along with software to detect acceleration along nine axes. Additional details concerning an arm band are described in U.S. Patent Publication No. 2014/0240103, which is incorporated by reference herein in its entirety. In particular, FIGS. 3-6 and related description provide additional details for an arm band. In another embodiment, a sequence indicative of an emergency event could be a combination of taps, swipes, gestures, jumps, hops, and/or arm movements. In another embodiment, as part of step 504, an indication of an emergency event may come from a health monitoring sensor, such as a sensor for detecting a seizure. In this embodiment, the user of HSS device 10 need not indicate an emergency event via taps, swipes, gestures, jumps, hops or arm movements.

In another embodiment, as part of step 504, an indication of an emergency event may be based on other parameters, such as time elapsed since HSS device 10 was last used to place or receive any calls. In one embodiment emergency event module 310 may work with operating system module 318 and other functionality of HSS device 10 to keep track of time that has elapsed since HSS device 10 was last used to place or receive any calls. Sensors 24, including GPS may automatically provide the location of HSS device 10 to emergency event module via sensor module 314. Additional details concerning determining an amount of time that has elapsed since a mobile device was last used are described in U.S. Patent Publication No. 2014/0321624, which is incorporated by reference herein in its entirety. In particular, FIGS. 1-4 and related description provide additional details regarding this functionality. In this embodiment, the user of HSS device 10 need not indicate an emergency event via taps, swipes, gestures, jumps, hops or arm movements.

In step 506, proximity detection module 312 may work in conjunction with the service side functionality discussed in FIG. 4 above to automatically determine whether a mobile device corresponding to a user identified as an emergency contact is in a state of proximity with HSS device 10. As an example, when emergency event module 310 automatically determines that the sequence entered by the user of HSS device 10 corresponds to an emergency event, emergency event module 310 may automatically request proximity detection module 312 to notify the user's contacts that have devices in a state of proximity to the user. Similarly, when emergency event automatically determines that the input from a health monitoring sensor or sensors qualifies as an emergency event, emergency event module 310 may automatically request proximity detection module 312 to notify the user's contacts that have devices in a state of proximity to the user. Upon receiving such a request, proximity detection module 312 may automatically contact via wireless networks 110 ProSe Function, such as ProSe Function A 422. ProSe Function A 422 may in turn work with Proximity App Server 426, which in turn may work with ProSe Function B 424 and other modules on the service side, such as SLP A 428, SLP B 430, MME 432, HSS 434, and S/P-GW 436 to determine whether a mobile device corresponding to a user identified as an emergency contact is in a state of proximity with HSS device 10. As described earlier, the state of proximity could be an actual state of proximity or a predicted state of proximity.

Next, in step 508, notification module 316 may automatically transmit a message, indicating the emergency event, to the user of the mobile device determined to be in a state of proximity by proximity detection module 312. In one embodiment, the message may be a pre-configured message that may be transmitted via Short Message Service (SMS), Multimedia Messaging Service (MMS), or similar services. In an alternative embodiment, prior to transmission, the pre-configured message may be automatically modified to include additional information based on sensor measurements. As an example, HSS device 10 may determine its velocity by interacting with a location server in wireless networks 110. The velocity may be included as part of the pre-configured message. As an another example, one of the sensors may be an accelerometer for detecting a shock to HSS device 10 and notification module 316 may automatically transmit such information to the user of the mobile device determined to be in the state of proximity.

In one embodiment, upon determining that a mobile device corresponding to a user identified as an emergency contact is in a state of proximity with HSS device 10, proximity detection module 312, working with service side functionality 420, may allow automatic direct discovery of one user device, such as UE B 404 by another user device, such as UE A 402. In addition, proximity detection module 312, working with service side functionality 420, may allow even direct communication between the UE A 402 and UE B 404.

In one embodiment, reserve battery 28 may be charged via kinetic energy. In one embodiment, battery 26 may supply power to the entire HSS device 10; but, reserve battery 28 may supply power to only those modules that are needed for performing steps 502, 504, 506, and 508 and any associated components of HSS device 10. In one embodiment, reserve battery 28 may continue to supply power to these modules, even if HSS device 10 is turned off by the user. In one embodiment, even when HSS device 10 is turned off, reserve battery 28 may supply power to only: (1) emergency event module 310, and (2) one or more of tap recognizer module 302, swipe recognizer module 304, or gesture recognizer module 306. The choice of modules may be based on the nature of the sequence entered by the user that corresponds to an emergency event. Once emergency event module 310 determines an emergency event, then reserve battery 28 may supply power to other modules, including proximity detection module 312, sensor module 314, notification module 316, and operating system module 318.

It is to be understood that the modules and components depicted herein are merely exemplary. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The invention claimed is:

1. A method for using a portable device in a wireless network, the method comprising:

the portable device storing a plurality of contacts of a user in a memory associated with the portable device, wherein a subset of the plurality of contacts of the user is designated by the user as contacts that may automatically receive location information, via the wireless network, corresponding to the user in case of an emergency;

in response to information generated by a wrist watch worn by the user of the portable device, the wrist watch having a touch screen configured to be in a locked state or an unlocked state, wherein the wrist watch is configured to generate the information, even when the touch screen is in the locked state, based on a specific input sequence to the wrist watch comprising a first input provided by the user followed by a second input provided by the user, wherein the first input provided by the user corresponds to a user input device associated with the wrist watch and the second input provided by the user corresponds to a swipe by the user across the touch screen associated with the wrist watch, without any further user interaction, the portable device automatically placing an emergency call; and in response to the information generated by the wrist watch, without any further user interaction, the portable device automatically obtaining, substantially in real-time, a current location of the portable device, automatically transmitting a pre-configured message to each of the subset of the plurality of contacts of the user including the current location of the portable device, and providing an intermittent location update corresponding to a location of the portable device.

2. The method of claim 1 further comprising the portable device receiving the information from the wrist watch encoded as a wireless signal through a personal area network different from the wireless network.

3. The method of claim 1, wherein the portable device is configured to operate in a first power mode or a second power mode, wherein the first power mode comprises supplying power to a predetermined number of modules of the portable device and the second power mode comprises supplying power to a subset of the number of modules of the portable device, wherein the subset of the modules comprises fewer modules than the predetermined number of modules, and wherein even when the portable device is in the second power mode, the portable device is further configured to supply power to the subset of the predetermined number of modules comprising at least the instructions to automatically place the emergency call.

4. The method of claim 3, wherein even when the portable device is in the second power mode, the portable device is further configured to supply power to the subset of the predetermined number of modules comprising at least the instructions to automatically obtain, substantially in real-time, the current location of the portable device and automatically transmit the pre-configured message to the each of the subset of the plurality of contacts of the user including the current location of the portable device.

5. The method of claim 1 further comprising the portable device automatically keeping track of an amount of time that has elapsed since the portable device was last used to perform a function associated with the portable device.

6. A portable device for use in a wireless network, the portable device comprising:
   at least one processor;
   a memory;
   a plurality of contacts of a user associated with the portable device stored in the memory, wherein a subset of the plurality of contacts of the user is designated by the user as contacts that may automatically receive location information, via the wireless network, corresponding to the user in case of an emergency; and
   one or more modules stored in the memory and configured for execution by the at least one processor, the one or more modules comprising instructions:
      to, using the wireless network, automatically place an emergency call, without any further user interaction, in response to information generated by a wrist watch worn by the user of the portable device, wherein the wrist watch having a touch screen configured to be in a locked state or an unlocked state, wherein the wrist watch is configured to generate the information, even when the touch screen is in the locked state, based on a specific input sequence to the wrist watch comprising a first input provided by the user followed by a second input provided by the user, wherein the first input provided by the user corresponds to a user input device associated with the wrist watch and the second input provided by the user corresponds to a swipe by the user across the touch screen associated with the wrist watch, and
      to, in response to the information generated by the wrist watch, without any further user interaction, automatically obtain, substantially in real-time, a current location of the portable device, automatically transmit a pre-configured message to each of the subset of the plurality of contacts of the user including the current location of the portable device, and provide an intermittent location update corresponding to a location of the portable device.

7. The portable device of claim 6 further comprising instructions to receive the information from the wrist watch encoded as a wireless signal through a personal area network different from the wireless network.

8. The portable device of claim 6, wherein the portable device is configured to operate in a first power mode or a second power mode, wherein the first power mode comprises supplying power to a predetermined number of modules of the portable device and the second power mode comprises supplying power to a subset of the predetermined number of modules of the portable device, wherein the subset of the modules comprises fewer modules than the predetermined number of modules, and wherein even when the portable device is in the second power mode, the portable device is further configured to supply power to the subset of the predetermined number of modules comprising at least the instructions to automatically place the emergency call.

9. The portable device of claim 8, wherein even when the portable device is in the second power mode, the portable device is further configured to supply power to the subset of the predetermined number of modules comprising at least the instructions to automatically obtain, substantially in real-time, the current location of the portable device and automatically transmit the pre-configured message to the each of the subset of the plurality of contacts of the user including the current location of the portable device.

10. The portable device of claim 6 further comprising instructions to automatically track an amount of time that has elapsed since the portable device was last used to perform a function associated with the portable device.

11. A portable device for use in a wireless network, the portable device comprising:
    at least one processor;
    a memory;
    a plurality of contacts of a user associated with the portable device stored in the memory, wherein a subset of the plurality of contacts of the user is designated by the user as contacts that may automatically receive location information, via the wireless network, corresponding to the user in case of an emergency; and
    one or more modules stored in the memory and configured for execution by the at least one processor, the one or more modules comprising instructions:
       to automatically obtain an emergency number to dial depending upon a location of the portable device and using the wireless network automatically place an emergency call to the emergency number, without any further user interaction, in response to information generated by a wrist watch worn by the user of the portable device, wherein the wrist watch having a touch screen configured to be in a locked state or an unlocked state, wherein the wrist watch is configured to generate the information, even when the touch screen is in the locked state, based on a specific input sequence to the wrist watch comprising a first input provided by the user followed by a second input provided by the user, wherein the first input provided by the user corresponds to a user input device associated with the wrist watch and the second input provided by the user corresponds to a swipe by the user across the touch screen associated with the wrist watch, and
       to, in response to the information generated by the wrist watch, without any further user interaction, automatically obtain, substantially in real-time, a current location of the portable device, automatically transmit a pre-configured message to each of the subset of the plurality of contacts of the user including the current location of the portable device, and provide an intermittent location update corresponding to a location of the portable device.

12. The portable device of claim 11 further comprising instructions to receive the information from the wrist watch encoded as a wireless signal through a personal area network different from the wireless network.

13. The portable device of claim 11, wherein the portable device is configured to operate in a first power mode or a second power mode, wherein the first power mode comprises supplying power to a predetermined number of modules of the portable device and the second power mode comprises supplying power to a subset of the predetermined number of modules of the portable device, wherein the subset of the modules comprises fewer modules than the predetermined number of modules, and wherein even when the portable device is in the second power mode, the portable device is further configured to supply power to the subset of the predetermined number of modules comprising at least the instructions to automatically place the emergency call.

14. The portable device of claim 13, wherein even when the portable device is in the second power mode, the portable device is further configured to supply power to the subset of the predetermined number of modules comprising at least the instructions to automatically obtain, substantially in real-time, the current location of the portable device and automatically transmit the pre-configured message to the each of the subset of the plurality of contacts of the user including the current location of the portable device.

15. The portable device of claim 11 further comprising instructions to automatically track an amount of time that has elapsed since the portable device was last used to perform a function associated with the portable device.

16. A portable device for use in a wireless network, the portable device comprising:
at least one processor;
a memory;
a plurality of contacts of a user associated with the portable device stored in the memory, wherein a subset of the plurality of contacts of the user is designated by the user as contacts that may automatically receive location information, via the wireless network, corresponding to the user in case of an emergency; and
one or more modules stored in the memory and configured for execution by the at least one processor, the one or more modules comprising instructions:
to automatically obtain an emergency number to dial depending upon a location of the portable device and using the wireless network, automatically place an emergency call, without any further user interaction, in response to information generated by a wrist watch worn by the user of the portable device, wherein the wrist watch having a touch screen configured to be in a locked state or an unlocked state, wherein the wrist watch is configured to generate the information, even when the touch screen is in the locked state, based on a specific input sequence to the wrist watch comprising a first input provided by the user followed by a second input provided by the user, wherein the first input provided by the user corresponds to a user input device associated with the wrist watch and the second input provided by the user corresponds to a swipe by the user across the touch screen associated with the wrist watch, and to, in response to the information generated by the wrist watch, without any further user interaction, automatically obtain, substantially in real-time, a current location of the portable device, automatically transmit a pre-configured message to each of the subset of the plurality of contacts of the user including the current location of the portable device.

17. The portable device of claim 16 further comprising instructions to receive the information from the wrist watch encoded as a wireless signal through a personal area network different from the wireless network.

18. The portable device of claim 16, wherein the portable device is configured to operate in a first power mode or a second power mode, wherein the first power mode comprises supplying power to a predetermined number of modules of the portable device and the second power mode comprises supplying power to a subset of the predetermined number of modules of the portable device, wherein the subset of the modules comprises fewer modules than the predetermined number of modules, and wherein even when the portable device is in the second power mode, the portable device is further configured to supply power to the subset of the predetermined number of modules comprising at least the instructions to automatically place the emergency call.

19. The portable device of claim 18, wherein even when the portable device is in the second power mode, the portable device is further configured to supply power to the subset of the predetermined number of modules comprising at least the instructions to automatically obtain, substantially in real-time, the current location of the portable device and automatically transmit the pre-configured message to the each of the subset of the plurality of contacts of the user including the current location of the portable device.

20. The portable device of claim 16 further comprising instructions to automatically track an amount of time that has elapsed since the portable device was last used to perform a function associated with the portable device.

21. A method for using a portable device in a wireless network, the method comprising:
the portable device storing a plurality of contacts of a user in a memory associated with the portable device, wherein a subset of the plurality of contacts of the user is designated by the user as contacts that may automatically receive location information, via the wireless network, corresponding to the user in case of an emergency;
in response to information generated by a wrist watch worn by the user of the portable device, the wrist watch having a touch screen configured to be in a locked state or an unlocked state, wherein the wrist watch is configured to generate the information, even when the touch screen is in the locked state, based on a specific input sequence to the wrist watch comprising a first input provided by the user followed by a second input provided by the user, wherein the first input provided by the user corresponds to a user input device associated with the wrist watch and the second input provided by the user corresponds to a swipe by the user across the touch screen associated with the wrist watch, without any further user interaction, using the wireless network, the portable device automatically obtaining an emergency number to dial depending upon a location of the portable device and the portable device automatically placing an emergency call to the emergency number; and in response to the information generated by the wrist watch, without any further user interaction, the portable device automatically obtaining, substantially in real-time, a current location of the portable device, automatically transmitting a pre-configured message to each of the subset of the plurality of contacts of the user including the current location of the portable device, and providing an intermittent location update corresponding to a location of the portable device.

22. The method of claim 21 further comprising the portable device receiving the information from the wrist watch encoded as a wireless signal through a personal area network different from the wireless network.

23. The method of claim 21, wherein the portable device is configured to operate in a first power mode or a second power mode, wherein the first power mode comprises supplying power to a predetermined number of modules of the portable device and the second power mode comprises supplying power to a subset of the number of modules of the portable device, wherein the subset of the modules comprises fewer modules than the predetermined number of modules, and wherein even when the portable device is in the second power mode, the portable device is further configured to supply power to the subset of the predetermined number of modules comprising at least the instructions to automatically place the emergency call.

24. The method of claim 23, wherein even when the portable device is in the second power mode, the portable device is further configured to supply power to the subset of the predetermined number of modules comprising at least the instructions to automatically obtain, substantially in real-time, the current location of the portable device and automatically transmit the pre-configured message to the each of the subset of the plurality of contacts of the user including the current location of the portable device.

25. The method of claim 21 further comprising the portable device automatically keeping track of an amount of time that has elapsed since the portable device was last used to perform a function associated with the portable device.

* * * * *

UNITED STATES PATENT AND TRADEMARK OFFICE
CERTIFICATE OF CORRECTION

PATENT NO. : 9,838,861 B2  
APPLICATION NO. : 15/594585  
DATED : December 5, 2017  
INVENTOR(S) : Arati P. Singh and Ranjeev K. Singh Page 1 of 1

It is certified that error appears in the above-identified patent and that said Letters Patent is hereby corrected as shown below:

On the Title Page

Item [54] and in the Specification, Column 1, Line 2, Delete "EMERGECNY" and insert
-- EMERGENCY --.

Signed and Sealed this
Sixth Day of November, 2018

Andrei Iancu
*Director of the United States Patent and Trademark Office*